United States Patent [19]

Peterson

[11] Patent Number: 5,096,350
[45] Date of Patent: Mar. 17, 1992

[54] CAGE NUT

[75] Inventor: Francis C. Peterson, Woodbury, Conn.

[73] Assignee: Buell Industries, Inc., Waterbury, Conn.

[21] Appl. No.: 407,684

[22] Filed: Sep. 13, 1989

Related U.S. Application Data

[63] Continuation-in-part of Ser. No. 239,702, Sep. 2, 1988, abandoned.

[51] Int. Cl.⁵ ............................................ F16B 39/284
[52] U.S. Cl. ..................................... 411/112; 411/160; 411/546; 411/535; 411/108
[58] Field of Search ........ 411/111, 112, 113, 160–163, 411/546, 583, 535, 544, 108, 432, 968, 969, 999

[56] References Cited

U.S. PATENT DOCUMENTS

| | | | |
|---|---|---|---|
| 1,368,604 | 2/1921 | Carmody | 411/162 |
| 2,228,217 | 1/1941 | Olson | 411/162 |
| 2,567,864 | 9/1951 | Becker | 411/112 |
| 2,649,883 | 8/1953 | Sharp | 411/113 |
| 3,025,897 | 3/1962 | Gieleghem | 411/113 |
| 3,136,206 | 6/1964 | Adams | 411/546 |
| 3,556,570 | 8/1968 | Cosenza | 411/999 |
| 3,695,324 | 10/1972 | Gulistan | 411/969 |
| 3,785,421 | 1/1974 | Launay | 411/112 |
| 4,193,435 | 3/1980 | Charles | 411/113 |
| 4,762,451 | 8/1988 | Collins | 411/427 |
| 4,793,757 | 12/1988 | Peterson | 411/544 |

FOREIGN PATENT DOCUMENTS

| | | | |
|---|---|---|---|
| 1055719 | 4/1959 | Fed. Rep. of Germany | 411/162 |
| 590614 | 4/1959 | Italy | 411/162 |

Primary Examiner—Renee S. Luebke
Assistant Examiner—F. Saether
Attorney, Agent, or Firm—St. Onge Stewart Johnston & Reens

[57] ABSTRACT

A cage nut for minimizing problems of paint welding comprises a body having a threaded bore, and means for encaging that body, and a separating member located between the body and the necaging means. The separating member may take a variety of shapes, forms and orientations, but is preferably a shim having an uneven surface. In one possible embodiment, the shim may be formed with four detents extending from the surface of the shim towards the body.

17 Claims, 2 Drawing Sheets

CAGE NUT

This is a continuation-in-part of copending application(s) Ser. No. 07/239,702 filed on Sep. 2, 1989 now abandoned.

FIELD OF THE INVENTION

The present invention relates to encaged female threaded fasteners which minimize problems of undesired welding or adhesion of the fastener body to the cage by the application of paint or other coatings.

BACKGROUND OF THE INVENTION

It is a common manufacturing practice to apply coatings of paint or other decorative or protective coatings to large subassemblies prior to final assembly of the completed product. For example, in the manufacture of automobiles, the body of the automobile will be formed and assembled, and then painted. Other automotive subassemblies such as suspension parts, undercarriages, or closures for the automobile (such as the doors, hood, and trunk lid) are separately manufactured and painted, and are assembled with the painted automobile body to form a complete automobile.

In most cases, the subassemblies of the automobile will be secured to the auto body by threaded fasteners. However, the use of threaded fasteners often presents difficulties in final assembly. For example, in the case of assembling a door into a body, one of the matching threaded fasteners, for example, a female fastener, may be located inside a door pillar. The door pillar in a modern automobile of unibody construction very often is a hollow metal part which may be completely enclosed after manufacture of the vehicle body. In order to provide a female fastener inside the pillar it is necessary to mount the female fastener, for example, by welding, inside the pillar when the body is being manufactured.

Due to variations in manufacturing tolerances, a degree of position adjustment for the female fastener must be provided so that the door and body may be properly aligned during final assembly. Position adjustment is provided by using a female fastener which is a cage nut, which is usually a nut encaged in a structure that is attached to the inside of the door pillar. The nut is provided with a range of movement within the encaging structure so that when the door is assembled to the body, the alignment of the door and the body can be adjusted until they meet manufacturing standards.

Cage nuts are also frequently used in situations where the nut is not completely enclosed. In these situations the use of a cage nut welded onto the body prior to final assembly reduces the time needed for final assembly of the automobile.

It has been found however, that during the step of painting and baking paint on the body of the auto, that the nut will often weld or adhere to the cage. This paint welding creates problems in the step of assembling and aligning the door or other subassembly with the body, because the nut no longer has any freedom of movement. It can be difficult to free the paint welded nut from the cage if it is in an enclosed space. Consequently, the final assembly of the automobile will be slowed while these parts are freed up enough so that the door or other subassembly can be properly aligned and assembled with the body.

One solution to this problem has been proposed, and that is the application of a coating of polytetraflouroethylene (PTFE) to the parts needing protection from paint welding, usually to the base of the nut. However, this procedure has been found to be costly because of the expense of the PTFE material. In addition, the presence of PTFE is undesireable on the joining surfaces of a nut or washer, as it reduces the frictional locking effect of the nut against the clamped surface.

SUMMARY OF THE INVENTION

It is an object of the present invention to provide a female fastener that minimizes problems of paint welding of a nut to its cage.

This object, and other objects that will become apparent by the description that follows, are achieved by a female fastener generally comprising a body having a threaded bore, and means for encaging that body, and a separating member disposed between the body and the encaging means. More specifically, the invention comprises a female fastener comprised of a generally planar base having generally planar upper and lower surfaces, a stem extending from the upper surface of the base, and a threaded bore extending through the base and into the stem. A cage generally confines the movement of the female fastener in all directions but permits a limited range of movement in at least one planar direction. The cage comprises a generally planar base having generally planar upper and lower surfaces. The base of the cage has an aperture sized and located to permit access to the bore of the female fastener within its range of planar movement. The cage further comprises leaf elements extending from the base portion of the cage; at least a portion of the leaf elements overlay at least a portion of the upper surface of the base the said female fastener. A separating member is interposed between the lower surface of the base of the female fastener and the upper surface of the base of the cage. The separating member reduces the planar contact surface area between the lower surface of the base of the female fastener and the upper surface of the base of the cage.

In one preferred embodiment, the separating member comprises a shim having an uneven surface, preferably in the form of at least one projection and most preferably four regularly spaced detents extending from the surface of the shim.

DESCRIPTION OF THE PREFERRED EMBODIMENT

Figure 3:
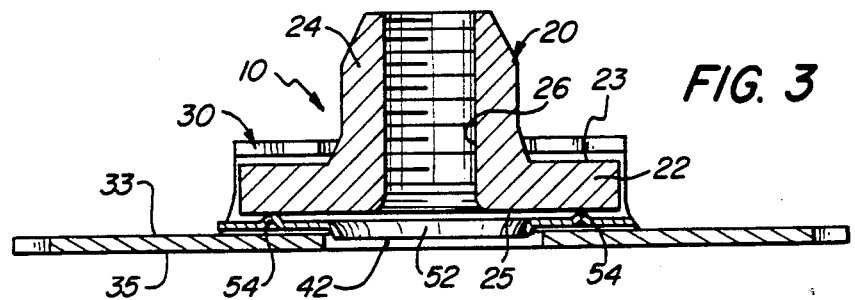
FIG. 3 is a cross-sectional view along line 3—3 of FIG. 2 of the cage nut of the present invention
Figure 2:
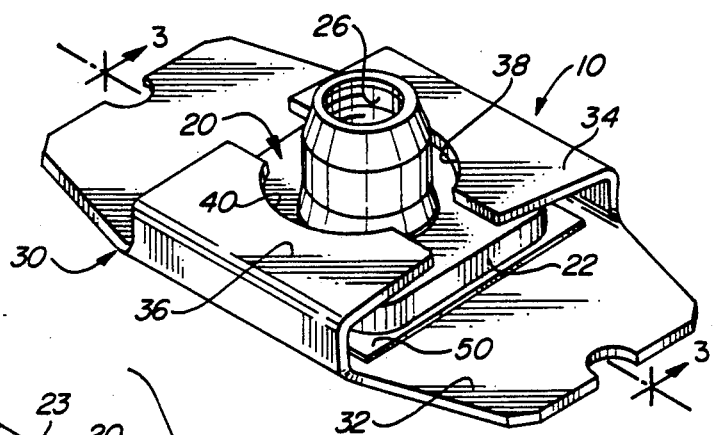
FIG. 2 is a perspective view of an assembled embodiment of the cage nut of the present invention.
Figure 1:
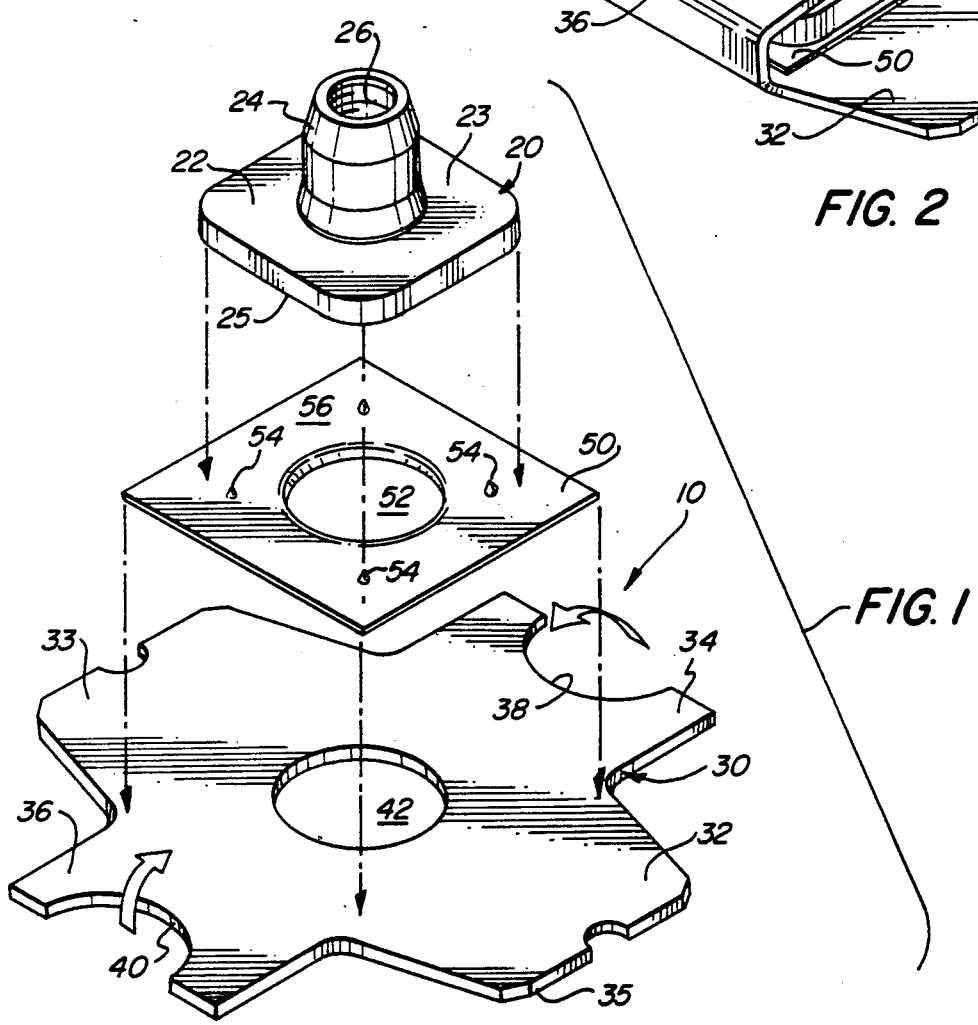
FIG. 1 is an exploded view of an unassembled embodiment of the cage nut of the present invention.

With reference to FIGS. 1, 2, and 3, a female fastener, shown generally at 10, comprises a body 20 which comprises a generally planar base 22 having generally planar upper and lower surfaces 23 and 25 respectively and a cylindrical stem 24 extending therefrom. Body 20 may have many other shapes, and the particular shape shown is for illustration only. Threaded bore 26 extends through body 20 from the base 22 into stem 24. Bore 26 may be closed at one end or it may extend all the way through the body 20.

Means for encaging the body is provided around the body 20. The encaging means, shown as cage 30 in the figures, comprises a generally planar base 32 having generally planar upper and lower surfaces 33 and 35 respectively and two leaf elements 34 and 36 extending from at least a portion of the base 32. The leaf elements 34 and 36 are bent to enclose the base 22 of the body 20. The leaf elements 34 and 36 overly at least a portion of the upper surface 23 of the base 22 of the female fastener so that the planar and vertical motion of the body 20 is generally restricted within the cage by the the overlying leaf elements 34 and 36. The leaf elements 34 and 36 have generally semicircular cutouts 38 and 40 at their ends which surround the stem 24 at a radial distance therefrom. The cage 30 is sized so that the body 20 has a limited range of movement in at least one dimension (e.g. at least one planar direction), and preferably in two dimensions. The range of planar movement in the embodiment of the invention shown in the Figures is determined by the leaf elements 34 and 36 which surround the stem 24. An aperture 42 is provided in the cage 30 to allow access through the base of the cage 30 to the bore 26 of body 20 within the range of movement of the body 20. At least a portion of the upper surface 33 of the base 32 of the cage is adjacent to the lower surface 25 of the base 22 of the female fastener.

A separating member is interposed between the lower surface 25 of the base 22 of the female fastener and the upper surface 33 of the base 32 of the cage 30. The separating member reduces the planar contact surface area between the lower surface 25 of the base 22 of the female fastener and the upper surface 33 of the base 32 of the cage 30. The separating member preferably comprises at least one projection extending between these two surfaces. The at least one projection may comprise ridges, rings, detents or other separating projections which reduce planar contact between these surfaces and which will drain off any paint which might collect between the two surfaces. The at least one projection may be associated with the lower surface 25 of the base 22 of the female fastener, or it may be associated with the upper surface 33 of the base 32 of the cage, or it may be located on a separate, generally planar element located between the lower surface 25 of the base 22 of the female fastener and the upper surface 33 of the base 32 of the cage 30.

In the preferred embodiment, the separating member comprises a shim 50, which is a generally planar element disposed between the upper surface 33 of the base 32 of the cage 30 and the lower surface 25 of the base 22 of the female fastener. Shim 50 has an uneven surface which will allow drainage of paint along its surfaces facing either or both the upper surface 33 of the base 32 of the cage 30 and the lower surface 25 of the base 22 of the female fastener. Shim 50 has an aperture 52 sized and located to provide access to the bore 26 within the range of movement of the body 20 provided by the cage 30. Shim 50 may comprise any number of shapes or forms; it may be a solid plate as shown in the Figures, or it may be a grid, or a woven structure, or a spring stucture, such as a coil spring or a square plate bent up at opposite ends.

Figure 4:
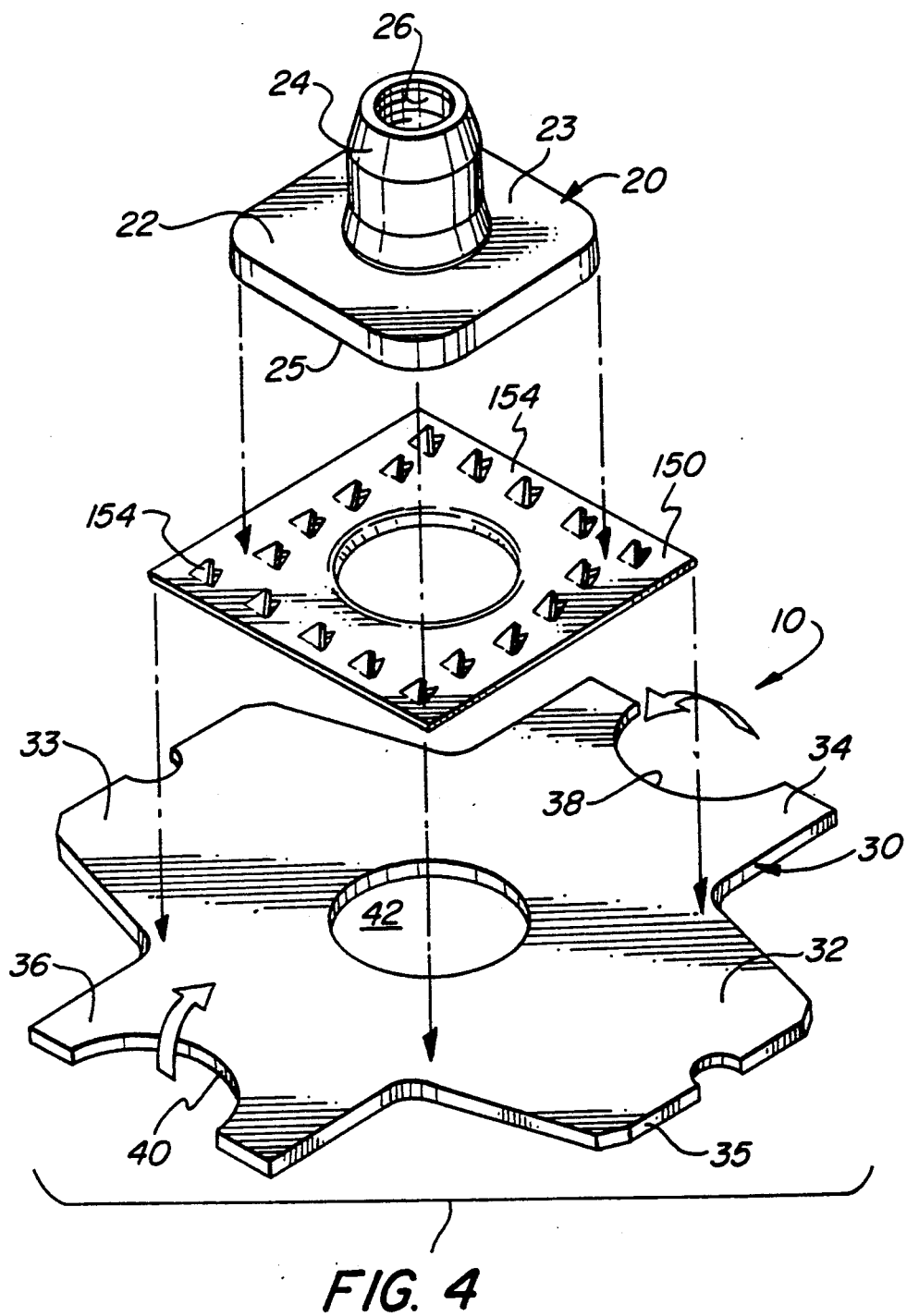
FIG. 4 is an exploded view of another preferred embodiment of the invention.

The embodiment shown in FIGS. 1-3 is a thin metal plate with at least one projection extending therefrom. In the preferred embodiment, the at least one projection comprises four detents 54 which extend from the surface 56 of the shim towards the body 20. The detents flatten out when the female fastener is clamped together with a male fastener, allowing a secure connection of the fasteners and any parts contained between them. The projection may take other forms as discussed above, namely a ring, ribs, ridges, or other shapes formed or punched in the shim. The shim may also be perforated in the vicinity of the projection. In another preferred embodiment shown in FIG. 4, the shim 150 comprises at least one pointed flattenable projection 154. The at least one projection 154 may be generally triangular in shape and is punched from shim 150. The projection 154 may extend towards either or both the body 20 or cage 30. Preferably a plurality of such projections 154 are provided. Other sharp edged flattenable projections of different shapes may be punched from the shim 150 to minimize the planar paint contact area within the scope of the invention.

The embodiment shown in the Figures has the advantage of economy of manufacture. However, other embodiments, including those where detents formed on a shim extend toward the base 32 of the cage 30 are also practicable, and as already discussed, the shim may be omitted completely and detents, ridges or other projections may be formed directly on the the lower surface 25 of the body 20 or on the upper surface of the base 32 of cage 30. The drawings thus do not limit the invention, and are only illustrative of it.

The shimmed cage nut of the present invention may be manufactured from steel or other metals using standard metal forming techniques. The cage 30 may be stamped from sheet metal. The shim also may be a stamped piece. The body 20 may be cast or formed by cold forming techniques.

The shimmed cage nut of the present invention minimizes problems of paint welding by providing a separation which allows drainage of paint and minimizes contact between the body and the cage that could cause paint welding. The shimmed cage nut can expedite the manufacture of large assemblies in which a cage nut is used.

I claim:

1. A female fastener comprising:
   a body having a threaded bore therein;
   means for encaging said female fastener, said encaging means providing a limited range of movement of said body in at least one dimension, and having an aperture therein sized and located to allow access to said bore within the range of movement of said body; and
   a shim for separating said body from said encaging means and leaving a space therebetween, said shim comprising a generally flat plate having a plurality of flattenable projections extending therefrom and having an aperture sized and located to provide access to the bore of said body within the range of movement provided by said encaging means;
   whereby the planar contact surface area between the body and encaging means is minimized such that welding of said body and said encaging means by paint or other coatings is minimized.

2. A female fastener in accordance with claim 1, wherein said shim has formed in it four detents extending from the surface of said shim adjacent said body towards said body.

3. A female fastener in accordance with claim 1, wherein said body comprises a planar base having a cylindrical stem extending therefrom, and wherein said encaging means comprises a planar base having two leaf elements extending therefrom and bent to enclose the base of said body, said leaf elements being formed at their ends to surround said stem at a distance sufficient to allow a limited range of movement.

4. A female fastener in accordance with claim 1, wherein said projections are generally sharp edged.

5. A female fastener in accordance with claim 4, wherein said projections generally comprise triangles formed from said generally flat plate.

6. A female fastener comprising:
a body having a threaded bore therein;
a cage having a generally planar base and two leaf elements extending therefrom and bent to enclose said body, said leaf elements being formed at their ends to surround said body at a distance sufficient to allow said body a limited range of movement in at least one dimension and having an aperture therein sized and located to allow access to said bore within the range of movement of said body; and
a shim having an uneven surface disposed between the surfaces of said body and said plate, said uneven surface comprising at least one flattenable projection, said shim minimizing the planar contact surface area between said body and said base of said cage and separating said body and cage base and leaving a space therebetween, and having an aperture sized and located to provide access to the bore of said body within the range of movement provided by said plate leaf elements.

7. A female fastener in accordance with claim 6, wherein said shim has formed in it four regularly distributed detents extending from the surface of said shim adjacent said body towards said body.

8. A female fastener in accordance with claim 6, wherein said at least one projection is generally sharp edged.

9. A female fastener in accordance with claim 8, wherein said at least one projection generally comprises a triangle formed from said generally flat plate and has a pointed end directed towards at least one of said body or cage.

10. A female fastening element comprising:
a female fastener comprised of a generally planar base having generally planar upper and lower surfaces, a stem extending from the upper surface of said base, and a threaded bore extending through said base and into said stem;
a cage for generally confining said female fastener while permitting a limited range of movement of said female fastener in at least one planar direction, said cage comprising a generally planar base having generally planar upper and lower surfaces, said base of said cage having an aperture therein sized and located to permit access, through the base of said cage, to the bore of said female fastener within the range of planar movement of said female fastener within said cage, at least a portion of the upper surface of the base of said cage containing said aperture being adjacent the lower surface of the base of said female fastener, said cage further comprising leaf elements extending from at least the base portion of the cage which is adjacent the lower surface of the base of said female fastener, at least a portion of said leaf elements overlying at least a portion of the upper surface of the base of said female fastener such that planar and vertical motion of said female fastener is generally restricted within said cage by the overlying portions of said leaf elements while a limited range of movement of said female fastener in at least one planar direction within said cage is permitted; and
a separating member interposed between the lower surface of the base of said female fastener and the upper surface of that portion of the base of said cage which is adjacent the lower surface of the base of said female fastener, said separating member having at least one flattenable projection for minimizing the planar contact surface area between said lower surface of the base of said female fastener and said upper surface of the base of said cage adjacent thereto.

11. A female fastening element in accordance with claim 10, wherein said at least one projection comprises four detents extending from the upper surface of said generally planar element toward the lower surface of the base of said female fastener.

12. A female fastening element in accordance with claim 10, wherein said separating member is associated with the upper surface of the base of said cage.

13. A female fastening element in accordance with claim 12, wherein said separating member comprises at least one upwardly extending projection associated with the upper surface of the base of said cage.

14. A female fastening element in accordance with claim 10, wherein said separating member is associated with the lower surface of the base of said female fastener.

15. A female fastening element in accordance with claim 14, wherein said separating member comprises at least one downwardly extending projection associated with the lower surface of the base of said female fastener.

16. A female fastener in accordance with claim 10, wherein said at least one projection is generally sharp edged.

17. A female fastener in accordance with claim 16, wherein said at least one projection is generally triangular and formed from said generally flat plate and has a pointed end directed towards at least one of said body or cage.

* * * * *